UNITED STATES PATENT OFFICE.

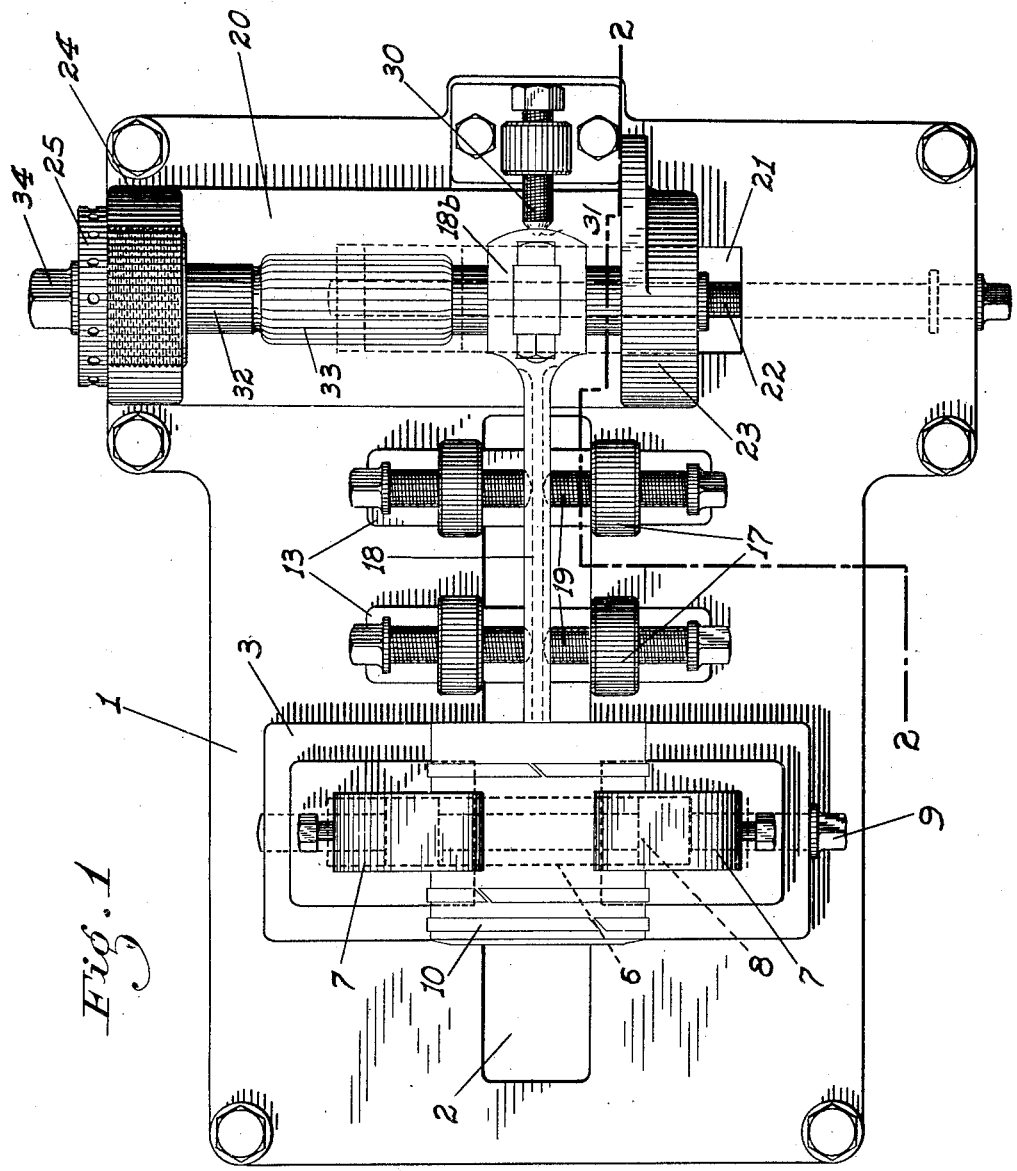

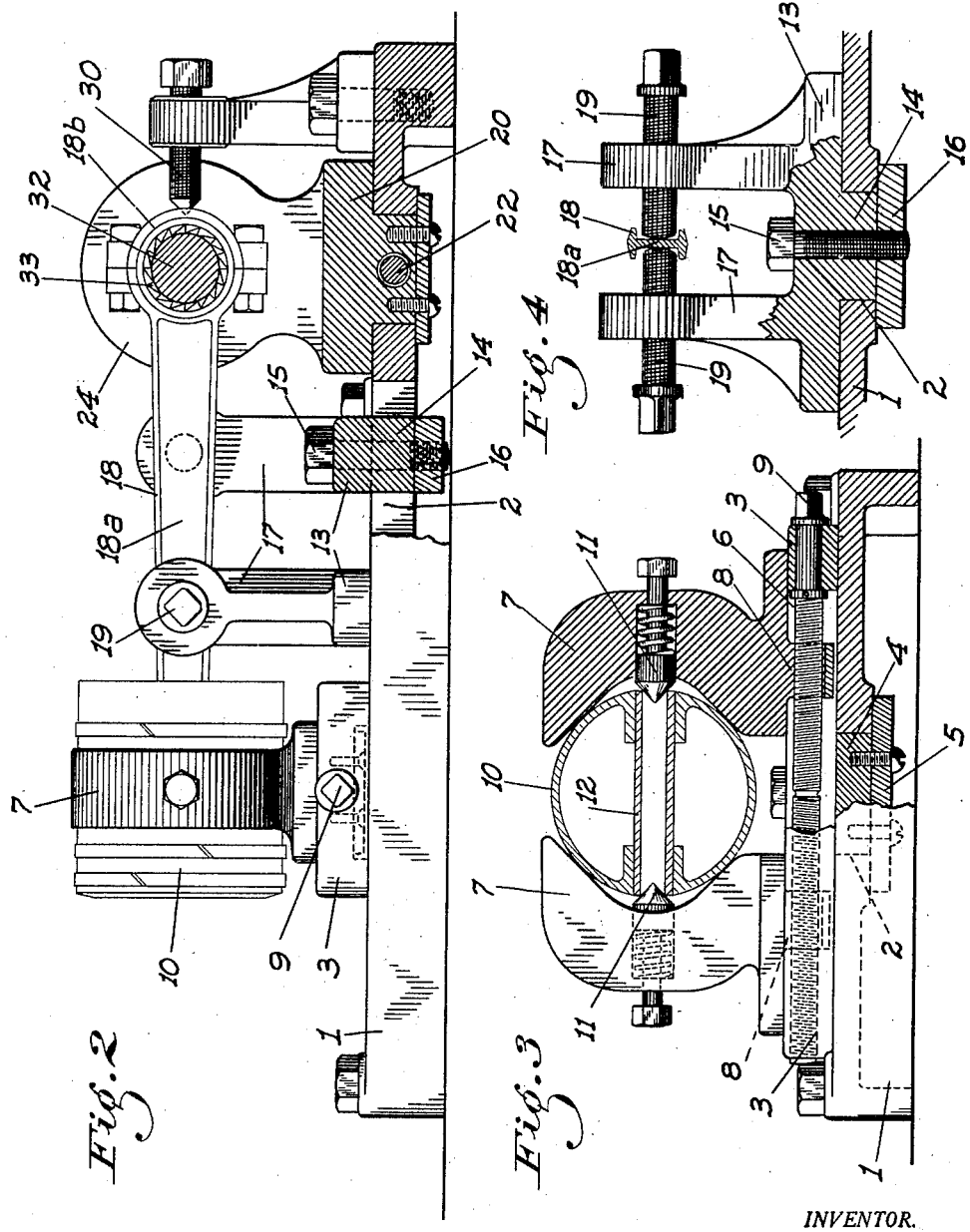

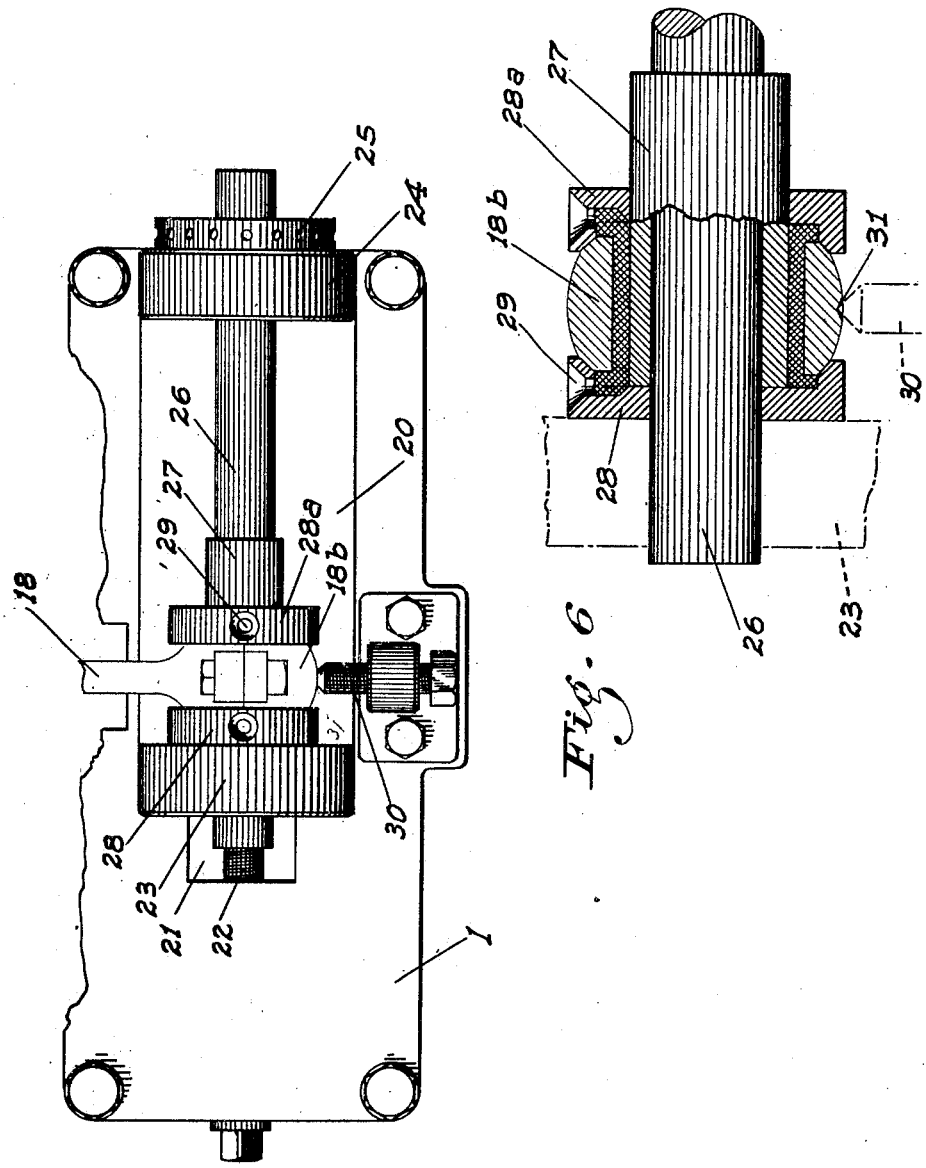

CHARLES G. PATMON, OF STOCKTON, CALIFORNIA.

DEVICE FOR BABBITTING, REAMING, AND STRAIGHTENING CONNECTING-RODS.

1,368,194.  Specification of Letters Patent.  Patented Feb. 8, 1921.

Application filed July 7, 1919. Serial No. 309,034.

*To all whom it may concern:*

Be it known that I, CHARLES G. PATMON, a citizen of the United States of America, residing at Stockton, in the county of San Joaquin, State of California, have invented certain new and useful Improvements in Devices for Babbitting, Reaming, and Straightening Connecting-Rods; and I do declare the following to be a clear, full, and exact description of the same, reference being had to the accompanying drawings, and to the characters of reference marked thereon, which form a part of this application.

This invention relates to improvements in a device for babbitting and reaming the crank shaft bearing ends of connecting rods and for straightening the same when necessary, being particularly intended for the connecting rods of internal combustion engines.

Heretofore, when fitting new babbitts to such connecting rods, it has been necessary to remove the rod from the piston, and ream or scrape the bearing by hand to the necessary accuracy. This necessitates removing the cap from the rod in order to try it out on the crank shaft and when this operation has to be repeated several times, it becomes a long and expensive proceeding.

Furthermore, accurate results with this method are exceptional, rather than the rule, as there is no way of telling with any certainty when the parts are dismantled, whether the crank shaft bearing lines up with the piston pin bearing.

As a result, supposing the bearings to be out of line with each other, a rapid wearing of the bearings takes place when the engine is again in service which not only necessitates new bearings again, but throws a strain on the rod and the piston, which quickly wears out the engine.

Again, presuming that the crank shaft bearing is truly in line with the piston pin bearing, it is not necessarily in line with the piston itself, as the piston pin may not be accurately set therein. While such inaccuracies may only be expressed in thousandths o fan inch, the efficiente and economical working of gas engines depends on the absolutely accurate fitting of its parts, in order to avoid pounding, undue strain, and consequent rapid wear of the engine.

The principal object of my invention, therefore, is to provide a device by means of which the connecting rod may be securely held without removing the same from the piston, and while so held, may be straightened, the babbitt for the new bearing poured and the bearing reamed to an accurate fit, all at one setting, and in a very short period of time.

Another object is to provide a device which will be adaptable for any diameter of piston and any length of connecting rod.

A further object of the invention is to provide a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a top plan view of my improved device, showing the bearing reamer in position.

Fig. 2 is a side elevation of the same, partly in section, taken on a line 2—2 of Fig. 1.

Fig. 3 is an end elevation, partly in section, of a piston gripping and holding means.

Fig. 4 is a detached view, partly in section, of a sliding rod-straightening means.

Fig. 5 is a partial plan view of the device, showing the babbitting apparatus in place.

Fig. 6 is an enlarged cross-section through the bearing end of the connecting rod, with the babbitting means in place and the babbitt poured.

Referring now more particularly to the characters of reference on the drawings, the numeral 1 designates the frame, which is provided with a slot 2 running substantially central and lengthwise thereof.

Mounted transversely of the slot is a block 3 having a lug 4 depending into and guided by the slot, such block being held in position on the frame by a plate 5 attached to the lug and overlapping the sides of the slot.

The member 4 is provided with a slot 6 therethrough, extending transversely of the slot 2.

On the block 3 are mounted a pair of jaw members 7, having lugs 8 depending therefrom and fitting closely into the slot 6. Secured in the block 3 is a right and left hand screw 9, which extends through the lugs 8, and by means of which, by turning the same with a wrench, the jaws 7 may be moved to or away from each other by reason of the right and left hand threading of the screw.

These jaws are adapted to hold a piston 10 between them, and are provided with oppositely disposed spring pressed pins 11 adapted to project into the hollow piston pin 12 so that the exact horizontal alinement of the piston held between the jaws may be had.

Mounted over the slot 2 are blocks 13 preferably spaced apart. These blocks are held in alinement relative to the slot 2 by lugs 14 depending therefrom. They may also be clamped at any desired point by means of bolts 15 extending therethrough and through plates 16 adapted to impinge against the under edges of the slot 2. Each block 13 has a pair of lugs 17 thereon extending upward above and on each side of the connecting rod 18, the same being mounted in the piston 10. Screws 19 project through the lugs 17 and are adapted to bear against the web 18ª of the connecting rod.

By this means, if a connecting rod is bent, the blocks 13 may be slid along the slot 2 and clamped at any desired point, and pressure exerted against the rod on either side through the medium of the screws 19. The modern connecting rods being very light and thin, they will be quickly and easily straightened.

Positioned beyond the end of the slot 2 and transversely thereof is a block 20 slidably mounted to the frame in the same manner as the block 3, in a slot 21, movement being given to the block 20 to travel lengthwise of said slot through the medium of a turnable screw 22 mounted in the frame 1.

At one end of the member 20 is a bearing 23 which is on the end of the block nearest the rod 18. The face of this bearing toward the rod is accurately faced off relative to the alinement of the slot 2 and the jaws 7, so as to form a testing plate adapted to be held against the face of the lower bearing end 18ᵇ of the rod 18, in order that the rod may be tested for accuracy of alinement relative to the piston, since both faces on the ends of the connecting rod are machined off in line with and at the same time the bearings are bored.

On the other end of the block 20 is another bearing member 24 having a shouldered bushing nut 25 screwed therein. In this nut and the bearing 23 a mandrel 26 is adapted to be mounted on which may be slid a bushing 27 whose outer diameter is equal to the desired diameter of the bearing in the rod-end 18ᵇ.

Caps or collars 28 and 28ª are slid on the mandrel and bushing, the cap 28 being preferably abutted against the member 23 on one side of the rod-end 18ᵇ, the bushing abutting against said cap on its other side, and the cap 28ª on the other side of the rod, both of them being so shaped and positioned as to bear closely against said rod-ends so as to form a complete closure between the bushing 27 and the bore at the bearing end of the connecting rod. This space is intended to be filled with babbitt to form the bearing, which may be poured into the space through orifices 29 provided in the caps 28 and 28ª.

The rod 18 is centered relative to the mandrel 26 by means of a cone pointed centering screw 30 mounted to the frame 1, and adapted to enter the recess 31 provided in the lower end of the connecting rod.

After the babbitting operation is completed, the mandrel is withdrawn, the nut 25 unscrewed and a shaft 32 having a reamer 33 thereon inserted through the orifice in the bearing 24, and mounted in the bearing 23 at the farther end. The nut 25 is then slipped over the shaft 32 and screwed back into place, the said shaft being shouldered beyond the nut 25 and ahead of the bearing 23 so that when the nut 25 is in position the shaft 32 is held firmly between its two bearings. The outer end of the shaft 32 is provided with a squared end 34, to attach a turning wrench thereto so that by moving the block 20 back and forth by means of the screw 22 and at the same time turning the shaft 32, the babbitt of the bearing will be accurately reamed to size.

The mandrel 26 and shaft 32 are preferably of the same diameter, so as to be interchangeable, while the outside diameters of the bushing 27 and reamer 33 may vary to conform to the required diameter of the bearing.

Of course, in some cases it will not be necessary to pour the babbitt, as bearings can be bought in the open market to fit certain sizes of rod. In that event, the reamer alone will be used.

The block 3 being adjustable in the slot 2, adapts the device to be used with different lengths of rods, while the adjustability of the jaws 7 permits pistons of any diameter being held.

Thus, from the foregoing description it will readily be seen that I have produced such a device as substantially fulfills the objects of the invention, as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:

1. A device for straightening connecting rods without removing the same from the piston comprising a frame, a block thereon, adjustable jaws on the block adapted to grasp the piston, a face plate on the frame exactly parallel with the working faces of the jaws and adapted to lie against the face of the connecting rod at its lower end whereby the same may be tested for accuracy of alinement relative to the piston, and means adjustable on the frame and adapted to exert a pressure on either side of the rod whereby the same may be straightened.

2. A device for straightening connecting rods without removing the same from the piston comprising a frame, jaws thereon adapted to grasp the piston, means on the frame whereby the accuracy of alinement of the connecting rod relative to the piston may be tested, and means whereby a pressure may be exerted agaist either side of the rod at any point in the length thereof to straighten the same.

3. A device for straightening connecting rods without removing the same from the piston comprising a frame, jaws thereon adapted to grasp the piston, means on the frame whereby the accuracy of alinement of the connecting rod relative to the piston may be tested, a plurality of blocks slidable on the frame lengthwise of the rod and having lugs thereon projecting upon each side of the rod and spaced therefrom, and screws in the lugs adapted to bear against the web of the rod.

4. A device for straightening connecting rods without removing the same from the piston, comprising a frame, a jaw-clamp thereon for holding the piston, straightening means on the frame beyond the clamp on each side of the plane of the rod, bearings mounted on the frame transversely of the line of the piston and central with the lower bore of the connecting rod, one of said bearings being on either side thereof, said bearings being arranged to receive a rod-bearing finishing means, and means for positioning and holding the connecting rod with its lower bore central with said bearings.

5. A device of the character described comprising a frame, a block slidable thereon, jaws on the block adjustable transversely of the plane of movement of the block, said jaws being arranged to be clamped about a piston, transverse bearing blocks on the frame adapted to receive a reamer for the bore of the connecting rod, means on the frame for positioning said bore in alinement with the reamer, and means on said frame and formed with one of said bearings for testing the accuracy of alinement of the connecting rod relative to the piston.

In testimony whereof I affix my signature in presence of two witnesses.

CHARLES G. PATMON.

Witnesses:
BERNARD PRIVAT,
VERADINE WARNER.